US012096541B2

(12) United States Patent
Stegmeier et al.

(10) Patent No.: US 12,096,541 B2
(45) Date of Patent: Sep. 17, 2024

(54) X-RAY HIGH-VOLTAGE GENERATOR WITH AN OSCILLATING HEAT PIPE

(71) Applicant: Siemens Healthcare GmbH, Erlangen (DE)

(72) Inventors: Stefan Stegmeier, Munich (DE); Florian Schwarz, Fuerth (DE); Stefan Waffler, Buckenhof (DE); Thomas Weidinger, Erlangen (DE); Andreas Hader, Erlangen (DE); Michael Wimmer, Weisendorf (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 18/186,320

(22) Filed: Mar. 20, 2023

(65) Prior Publication Data

US 2023/0300963 A1 Sep. 21, 2023

(30) Foreign Application Priority Data

Mar. 21, 2022 (DE) ..................... 10 2022 202 730.2

(51) Int. Cl.

*H05G 1/02* (2006.01)
*F28D 15/02* (2006.01)
*F28F 21/00* (2006.01)

(52) U.S. Cl.

CPC ......... *H05G 1/025* (2013.01); *F28D 15/0275* (2013.01); *F28F 21/00* (2013.01)

(58) Field of Classification Search

CPC ............................ H05G 1/025; F28D 15/0275
See application file for complete search history.

(56) References Cited

U.S. PATENT DOCUMENTS 5,451,352 A * 9/1995 Cook .................. C04B 41/5155 264/102
5,610,968 A * 3/1997 Deucher ................ A61B 6/035 378/2
5,682,412 A * 10/1997 Skillicorn ................ H05G 1/10 378/113
7,576,330 B1 8/2009 Lacey et al.
(Continued)

FOREIGN PATENT DOCUMENTS

CN 108806939 A 11/2018
DE 102009003792 A1 11/2009
(Continued)

OTHER PUBLICATIONS

Taft B.S et al.:"Non-Condensable Gases and Oscillating Heat Pipe Operation", Frontiers in Heat Pipes (FHP), 4, 013003 (2013).
(Continued)

*Primary Examiner* — Chih-Cheng Kao
(74) *Attorney, Agent, or Firm* — Harness, Dickey & Pierce, P.L.C.

(57) ABSTRACT

A two-phase cooling system for an X-ray high-voltage generator comprises a heat sink block and a heat sink. The heat sink block spatially surrounds a cooling duct loop, wherein the cooling duct loop is at least partially filled with a working medium and is configured to act as an oscillating heat pipe. The heat sink is configured to dissipate heat from a heat source. The heat sink block includes a material including a polymer.

16 Claims, 7 Drawing Sheets

(56) References Cited

U.S. PATENT DOCUMENTS

| | | | | |
|---|---|---|---|---|
| 2004/0174651 | A1 * | 9/2004 | Aisenbrey | F21V 29/76 361/103 |
| 2017/0167799 | A1 * | 6/2017 | Silvano de Sousa | H05K 7/20336 |
| 2018/0301392 | A1 * | 10/2018 | Stegmeier | H01L 24/84 |
| 2018/0322995 | A1 | 11/2018 | Kim et al. | |
| 2020/0279870 | A1 * | 9/2020 | Yoon | H01L 27/1248 |
| 2020/0398385 | A1 * | 12/2020 | Alahyari | B23P 15/26 |
| 2021/0204385 | A1 * | 7/2021 | Chen | H05G 1/04 |

FOREIGN PATENT DOCUMENTS

| | | | |
|---|---|---|---|
| DE | 112018000018 | T5 | 12/2018 |
| EP | 3336471 | A1 | 6/2018 |

OTHER PUBLICATIONS

Yang K.S. Tsung-Yi et al.:2A novel flat polymer heat pipe with thermal via for cooling electronic devices, Energy Conversion and Management 100 (2015) 37-44.

Schwarz F. et al.. “Interaction of flow pattern and heat transfer in oscillating heat pipes for hot spot applications”, Applied Thermal Engineering vol. 196, Sep. 2021, 117334, DOI: https://doi.org/10.1016/j.applthermaleng.2021.117334.

Der O., Marengo M. et al.: “Thermal performance of pulsating heat stripes (PHS) built with plastic materials”, Joint 19th IHPC and 13th IHPS, Pisa, Italy, Jun. 10-14, 2018.

Schwarz F. et al.: “Thermodynamic Analysis of the Dryout Limit of Oscillating Heat Pipes”, Energies 2020, 13(23), 6346; https://doi.org/10.3390/en13236346.

Der O., Alqahtani A. et al.:“Characterization of polypropylene pulsating heat stripes: Effects of orientation, heat transfer fluid, and loop geometry”, Applied Thermal Engineering 184 (2021) 116304.

German Office Action and English translation thereof dated Nov. 29, 2022.

German Decision to Grant and English translation thereof dated Nov. 6, 2023.

* cited by examiner

X-RAY HIGH-VOLTAGE GENERATOR WITH AN OSCILLATING HEAT PIPE

CROSS-REFERENCE TO RELATED APPLICATION(S)

The present application claims priority under 35 U.S.C. § 119 to German Patent Application No. 10 2022 202 730.2, filed Mar. 21, 2022, the entire contents of which are incorporated herein by reference.

FIELD

One or more example embodiments of the present invention relate to a two-phase cooling system for an X-ray high-voltage generator, the X-ray high-voltage generator, an X-ray tube assembly and a computed tomography device.

BACKGROUND

A conventional X-ray high-voltage generator is typically used to generate a high voltage in the kV range from a normal line voltage. This high voltage is present for example between an electron emitter and an anode of an X-ray tube, wherein electrons emitted by the electron emitter are accelerated via the high voltage to kinetic energies in the keV range and in interaction with the anode generate X-rays.

During the time of the X-ray generation an X-ray high-voltage generator such as this emits a comparatively high electrical peak power to the X-ray tube. Depending on the respective use, the electrical peak power lies in the range of several kw. In the period between the X-ray generation the X-ray high-voltage generator typically emits only a very small electrical average power or none at all. The X-ray high-voltage generator is normally therefore designed to provide a high peak power in the case of a small average power output.

Such a configuration of the X-ray high-voltage generator places high demands on a cooling system of the X-ray high-voltage generator. This is because during the output of the electrical peak power an accordingly high power loss input normally arises in the X-ray high-voltage generator. In order not to overheat the power-electronic circuitry parts provided in the X-ray high-voltage generator for the provision of the high voltage, the power loss converted into heat by the cooling system must be dissipated at least partially, preferably completely.

A further challenge is that the power-electronic circuitry parts, which in the X-ray high-voltage generator are generally operated in parallel, are preferably connected as uniformly as possible to a heat sink of the cooling system. In this case the heat must in part be transferred over routes of different lengths. The circuitry part that can be cooled the least, for example because it is the furthest away from the heat sink of the cooling system, typically in this case determines the performance of the entire X-ray high-voltage generator.

For example, a conventional cooling system can be dimensioned so as to be able to dissipate the maximum power loss input on a sustained basis. It is known for the cooling system of a conventional X-ray high-voltage generator to be fitted accordingly with intermediate heat accumulators, in order to be able to store the heat loss temporarily thanks to the heat capacity created thereby. Thanks to a specific configuration of the intermediate heat accumulator it is for example possible to set a power class of the cooling system. An intermediate heat accumulator such as this is preferably arranged close to the heat source, in particular the power-electronic component. An intermediate storage block with a high heat capacity, e.g. made of copper and/or aluminum, is for example suitable as an intermediate heat accumulator. The intermediate heat accumulator is normally connected to the heat source via as few thermal transitions as possible. Thanks to the heat capacity of the intermediate heat accumulator the power loss input arising during the X-ray generation can preferably be stored temporarily, whereupon with a higher time constant the thermal energy buffered in the intermediate heat accumulator is typically emitted to an external cooling medium. For this the power loss is for example emitted via a support plate to a heat sink, which can for example form a gantry of a computed tomography device.

A conventional cooling system such as this with an intermediate heat accumulator has a comparatively complex structure, which can consist of multiple elements, such as fixing plates, an intermediate storage block and power-electronic circuitry parts. The conventional cooling system is hence generally comparatively large and/or heavy, and because of the materials used this may be cost-intensive. High demands are also placed on the cooling system and the assembly process thereof by manufacturing tolerances which are in particular closely dependent on one another.

SUMMARY

An object of one or more example embodiments of the present invention is to specify a two-phase cooling system for an X-ray high-voltage generator, the X-ray high-voltage generator, an X-ray tube assembly and a computed tomography device with a more flexible and more powerful cooling system.

At least this object is achieved by the features of the independent claims, the dependent claims and/or embodiments discussed herein.

The two-phase cooling system for an X-ray high-voltage generator contains a heat sink block, wherein the heat sink block spatially surrounds a cooling duct loop, wherein the cooling duct loop is filled at least partially with a working medium and acts as an oscillating heat pipe, and a heat sink for dissipating heat from a heat source, characterized in that the heat sink block consists of a material which contains a polymer.

The two-phase cooling system in particular enables the following advantages:

A spatial decoupling of the heat sink and the heat source can advantageously be realized by the use of the two-phase cooling system, as a result of which the structure for example of the X-ray high-voltage generator becomes more flexible. In particular, the configuration of the heat sink block made of polymer with the internal cooling duct loop enables larger distances between the heat source and the heat sink to be bridged, typically without impairing the cooling power of the two-phase cooling system. The two-phase cooling system, in particular the cooling duct loop and the heat sink block, therefore enable spatial flexibilization, since unlike a conventional two-phase cooling system heat sinks spaced far apart can now advantageously be thermally coupled directly. The spatial flexibilization advantageously alternatively or additionally enables a more flexible design in the case of the configuration of the external shape of the two-phase cooling system, in particular of the heat sink block.

A further advantage of the two-phase cooling system relates to the possibility of being able to integrate different functions into the two-phase cooling system, in particular into the heat sink block made of the material which contains the polymer. In addition to heat dissipation, these functions for example comprise electrical insulation, distance compensation, a housing (part), an interface function and/or a shielding. As a result, at least one further conventional component typically required for these functions is advantageously omitted. Integrating these or some of the functions into the two-phase cooling system can additionally simplify and/or shorten a manufacturing process of the X-ray high-voltage generator, since typically fewer conventional components have to be assembled. This is generally associated with a cost advantage. The distance compensation can be effected by a customized design of the heat sink block. The housing function can be achieved in that the housing and the heat sink block are manufactured in one step. Because manufacture is possible using injection molding or 3D printing, this normally results in simpler possibilities for integration than with conventional metal sheets. The shielding function can in particular be achieved by at least partially coating the heat sink block e.g. by a fluid-tight layer, in particular a shielding or conductive layer, or by a metal element. The interface function can preferably be achieved by introducing a current guide, e.g. a busbar for high currents, a retaining device and/or a fastening element, into the heat sink block. The advantageous aspect of using the two-phase cooling system in the X-ray high-voltage generator is that in principle the two-phase cooling system is capable of working in a vacuum.

The two-phase cooling system comprises the heat sink and/or acts as a heat sink. The heat sink is in particular suitable for dissipating some of the power loss input converted into heat. The heat sink typically dissipates more power loss to a surrounding area outside the two-phase cooling system than the heat sink receives from the surrounding area. The heat sink is at least one subregion of the two-phase cooling system which is suitable for heat dissipation, for example because of the material composition, the internal structure and/or the external shape. The external shape of the heat sink can have a surface extension, such as cooling ribs or cooling fins. The heat sink can be a passive component or an active component, for example fitted with a fan. The heat sink can be operated actively or passively. The heat sink can be connected to the heat sink block and/or can be directly thermally coupled to the heat sink block.

The heat sink typically faces away from the heat source, such that the transferred heat is dissipated away from the heat source. The dissipation of heat from the heat source in particular comprises the cooling of the heat source. The heat sink is for example directly thermally coupled to a gaseous or liquid external cooling circuit to enhance the heat dissipation. In this case in particular the external cooling circuit forms the surrounding area of the heat sink and the heat sink typically acts as a transferer of heat to the external cooling circuit. The external cooling circuit can in particular be formed by an electrically insulating fluid, in particular oil, in which the two-phase cooling system, the X-ray high-voltage generator, the circuit arrangement and/or the at least one power-electronic circuitry part is mounted. The transfer of heat in the external cooling circuit can be based on forced convection.

The two-phase cooling system can in particular be designed for dissipating heat from the further electronic components and/or the power-electronic circuitry parts. The two-phase cooling system can in particular be designed to dissipate heat from a heat source at one heat sink, multiple heat sources at one heat sink, a heat source at multiple heat sinks or multiple heat sources at multiple heat sinks.

Directly thermally, thermally directly or thermally coupled means in particular that two elements are physically connected to one another for a transfer of heat. For example, the at least one power-electronic circuitry part can be connected to the two-phase cooling system, in particular is connected to or linked to the two-phase cooling system.

A cooling duct loop is provided in the heat sink block. The heat sink block typically surrounds the cooling duct loop completely, so that the working medium is substantially held back in the cooling duct loop by a duct wall of the cooling duct loop. Substantially means that depending on the material composition of the heat sink block and/or a certain porosity of the heat sink block a certain, typically minimal, diffusion of the working medium through the duct wall may occur.

The heat sink block can be designed as a single piece or as multiple pieces. The single-piece heat sink block is typically made from one piece or is monolithic. The multi-piece heat sink block can consist of multiple heat sink block elements, which when assembled form the heat sink block. The multiple heat sink block elements can be differently dimensioned and/or typically have the same material composition. For example, it is conceivable for a heat sink block element to surround the cooling duct loop and for a further heat sink block element to enclose a further cooling duct loop or no cooling duct loop. If the further heat sink block element does not enclose a cooling duct loop, the heat sink block element can in particular be used as a cover e.g. for the heat source or heat sink extension.

The heat sink block can in principle be designed as part of a housing in particular of the X-ray high-voltage generator. In this case a surface for example opposite the at least one power-electronic circuitry part typically forms the heat sink. A further advantage of the heat sink block can be if a retaining device for a metal element, e.g. a conductor plate, a fastening element and/or a power supply, is provided as part of the heat sink block.

The cooling duct loop comprises a self-contained path, along which the working medium runs back and forth, in particular oscillates, during operation. In this application the cooling duct loop acts as an oscillating heat pipe. The term pulsing can be used in this connection instead of oscillating. The cooling duct loop in particular has multiple straight and/or curved duct sections. The duct sections can be circular, meander-shaped, spiral, flat, oblong and/or square. The number of duct sections per unit of area can in particular be increased in the region of the heat sink and/or of the heat source.

The duct sections for example have a diameter of less than 6 mm, preferably less than 3 mm. A cross-section of the duct sections is for example between 0.1 and 50 mm^2, preferably between 0.25 and 4 mm^2. The duct sections are typically designed to enable a capillary flow or capillarity, in particular if the heat pipe is designed as an oscillating heat pipe. Thanks to the dominant surface tension in this case, gas and liquid phase exist separately from one another. The duct sections typically have a closed, for example tubular, in particular round or rectangular/square, cross-section. In operation the working medium oscillates back and forth in the cooling duct loop. The working medium can typically have a preferred direction of flow.

The two-phase cooling system is characterized in that the cooling duct loop has a first section facing the heat source and a second section facing the heat sink. At the first section the cooling duct loop typically takes up at least some of the power loss input and at the second section transfers at least some of the power loss input to the heat sink. For example, the working medium evaporates at the first section, also referred to as an evaporator, and condenses at the second section, also referred to as a condenser. The heat transfer therefore in particular takes place thanks to a phase change in the repeatable change between gas phase and liquid phase. The oscillating heat pipe uses the phase change and a convective heat transfer.

In respect of the basic operating principle and configuration of an (oscillating) heat pipe, reference is made to the publications by Taft, "Non-Condensable Gases and Oscillating Heat Pipe Operation", Frontiers in Heat Pipes (FPH), 4, 013003 (2013), DOI: 10.5098/fhp.v4.1.3003, Yang et al., "A novel flat polymer heat pipe with thermal via for cooling electronic devices", Energy Conversion and Management 100 (2015) 37-44, DOI: 10.1016/j.enconman.2015.04.063, Schwarz et al., "Interaction of flow pattern and heat transfer in oscillating heat pipes for hot spot applications", Applied Thermal Engineering Volume 196, September (2021), 117334, DOI: https://doi.org/10.1016/j.applthermaleng.2021.117334, Schwarz et al., "Thermodynamic Analysis of the Dryout Limit of Oscillating Heat Pipes", Energies 13, no. 23: 6346. https://doi.org/10.3390/en13236346, Der et al., "Characterization of polypropylene pulsating heat stripes: Effects of orientation, heat transfer fluid, and loop geometry", Applied Thermal Engineering 184 (2021) 116304, DOI: 10.1016/j.applthermaleng.2020.116304 and Der et al., "Thermal performance of pulsating heat stripes (PHS) built with plastic materials", Joint 19th IHPC and 13th IHPS, Pisa, Italy, Jun. 10-14, 2018.

The cooling duct loop can be partially filled with the working medium. The fill level of the cooling duct loop is typically between 10 and 90%, preferably between 30 and 80%. The fill level is defined as a function of the proportion of the working medium present in the liquid state relative to the volume. In particular, in operation the remaining part of the volume is filled with working medium in the gaseous state. The cooling duct loop can have a sealable opening for the regulation of the fill level of the working medium. The cooling duct loop is preferably hermetically and/or irreversibly sealed or sealable. In particular, the cooling duct loop can be sealed after the cooling duct loop has been filled. The opening of the cooling duct loop can for example by sealed by soldering, welding, screwing and/or fusing. The working medium in the cooling duct loop is in particular a fluid, which is preferably dielectrically, in particular electrically insulating. The working medium can in particular be acetone, ethanol, water, methanol, Fluoriniert-type products such as Novec, perfluorohexane, for example FC-72, a solvent, a cooling medium or a combination of the aforementioned substances.

In accordance with an embodiment of the present invention, the part of the heat sink block in contact with the working medium or the entire heat sink block is made of an electrically insulating material, e.g. from or containing the polymer. The two-phase cooling system can therefore preferably advantageously ensure the electrical insulation between heat source and heat sink, whereas in a conventional cooling system additional components are generally required for this, in particular when using copper and/or aluminum heat sink blocks.

The heat sink block of the two-phase cooling system therefore consists of a material which contains the polymer. In other words the heat sink block contains the polymer. In principle it is conceivable for the material of which the two-phase cooling system consists to additionally for example contain metal and/or ceramic, preferably without impairing the properties in the case of a structure containing the polymer, in particular the possibility of electrical insulation. A polymer heat sink block such as this in particular offers the advantage of lower costs, a lower weight and/or simpler processing in comparison with metal. Polymers are furthermore advantageously electrically insulating and/or are a magnetic. Polymers are typically not fluid-tight, in particular not gas-tight. The heat sink block is advantageously protected against an ingress of gas, in particular $O_2$, $CO_2$ and/or $H_2O$, for example via a fluid-tight layer. The heat sink block can be produced using an additive manufacturing process and/or an injection molding manufacturing process.

A cooling power of the working medium circulating in the cooling duct loop in operation is advantageously greater than a cooling power of the heat sink block surrounding the cooling duct loop. The two-phase cooling system is in other words designed such that the heat transfer in the cooling duct loop inside the heat sink block preferably significantly exceeds the thermal conduction of the heat sink block.

One form of embodiment provides that the polymer is polypropylene, polycarbonate, polyetheretherketone, polyamide or acrylnitrile-butadiene-styrole copolymer.

One form of embodiment provides that the material exclusively contains the polymer. In other words the material consists exclusively of the polymer. In this case the heat sink block forms a polymer heat sink block.

An alternative form of embodiment to this provides that the material additionally contains a metal and/or a ceramic and that the material is homogenized by commingling. The ceramic can in particular consist of $Al_2O_3$, $Si_3N$ or AlN. The metal can in particular be copper, aluminum, iron or alloys of these elements. For example, particles of the various elements, i.e. polymer and metal and/or ceramic particles, are commingled with one another to form the material of the heat sink block.

Ceramics, like glasses and metals, typically rank among the gas-tight materials. Depending on the gas, a certain thickness of the ceramic is necessary for the ceramic to be gas-tight. A thickness in the range of less than 100 nm is generally not sufficient, so that the ceramic typically only delays the gas diffusion. A thickness equal to or greater than 1 μm typically guarantees that the ceramic and/or a glass and/or a metal is gas-tight and thus fluid-tight.

One form of embodiment provides that the heat sink block has an inlay, in particular made of copper and/or aluminum, wherein the material of the inlay has a higher thermal conductivity than the material of the heat sink block. The inlay can be tight or porous. The inlay can for example be completely or partially enclosed by the heat sink block. Alternatively the inlay can be placed onto the heat sink block. The inlay advantageously enables a better thermal coupling between the various components, in particular between the heat sink, the heat source, the heat sink block and/or the cooling duct loop. In principle it is conceivable for the heat sink block to have multiple inlays or for the inlay to consist of multiple inlay elements, in particular structurally identical inlay elements.

It is conceivable for the heat sink block to have a further cooling duct loop and for the cooling duct loop and the further cooling duct loop to be thermally directly coupled via the inlay. The cooling duct loop and the further cooling duct loop can in principle be similarly structured, e.g. can be constructed from identical duct sections. In principle it is conceivable for the nature, e.g. a cross-section, a working medium, an arrangement, etc., of the duct sections of the cooling duct loop and of the further cooling duct loop, to differ. The working medium of the cooling duct loop and the working medium of the further cooling duct loop are in particular separated from one another, for example by the inlay and optionally additionally by the duct walls. The respective sealed paths therefore typically do not cross, so that the respective working media are not commingled. Thanks to the thermally direct coupling, the inlay advantageously enables heat to be transferred from the cooling duct loop to the further cooling duct loop and vice versa. In this configuration the heat source typically faces the cooling duct loop and the heat sink typically faces the further cooling duct loop. The inlay is in particular arranged between a duct section of the cooling duct loop and a duct section of the further cooling duct loop.

The following development is possible, namely that the cooling duct loop and the further cooling duct loop each lie in different geometric planes, wherein the planes have a spacing greater than zero and at least one extension of the inlay correlates with the absolute value of the spacing, in order to thermally bridge the spacing between the cooling duct loop and the further cooling duct loop, wherein the cooling duct loop and the further cooling duct loop are thermally directly coupled via the inlay. Both the planes are in particular aligned in parallel to one another. Both the planes are in particular spanned by the respective duct sections of the cooling duct loops. The form of embodiment advantageously enables a structure of the two-phase cooling system across multiple planes and/or in multiple layers, wherein the respective cooling duct loops are thermally directly coupled via the inlay and optionally further inlays. This form of embodiment therefore offers the advantage that an effect of gravity or centrifugal force on the working medium and a concomitant limitation of cooling power can be reduced, preferably eliminated. For this it can in particular be advantageous, for at least one plane, in particular to align the planes tangentially and/or perpendicularly to the direction of gravity and/or to the direction of centrifugal force. The centrifugal force, for example greater than 5 g and less than 200 g, in particular between 50 g and 150 g, typically approx. 100 g, can for example arise due to the use of the two-phase cooling system on a rotating part of the gantry of a computed tomography device.

In principle it is conceivable for the two-phase cooling system to have a support element for starting up the two-phase cooling system, in particular the oscillating heat pipe. The following five variants each describe such a support element, which in each case, when considered separately or in any combination, are suitable for improving the startup of the two-phase cooling system. The improvement can comprise an increase in the probability that the two-phase cooling system has started up.

The startup of the two-phase cooling system comprises in particular the startup of the oscillating heat pipe and/or means that the working medium is flowing inside the cooling duct loop. In this application, in operation of the two-phase cooling system is defined as meaning that the working medium is flowing. Thus the two-phase cooling system is ready for heat dissipation. In other words the two-phase cooling system dissipates heat as soon as the startup procedure commences. In order to start up, the two-phase cooling system must typically take up heat. In this case the heat dissipation, in particular the cooling effect, generally begins. The startup takes place in particular as soon as a temperature difference between the heat source and the heat sink is present. Prior to operation of the X-ray high-voltage generator the two-phase cooling system can in principle be inoperative, which means that during this time the working medium is not flowing in the cooling duct loop. The two-phase cooling system has preferably started up before or as soon as the at least one power-electronic circuitry part forms the heat source.

A first variant provides that the inlay is arranged inside the cooling duct loop and that the working medium flows around it and acts as a support element for the startup of the two-phase cooling system. In this form of embodiment the inlay can be tight or porous, e.g. a metal foam. The inlay is in particular arranged adjacent to the heat source and/or to the heat sink. Adjacent means in particular that the inlay can, because of the small distance from the heat source or from the heat sink, strengthen the thermally direct coupling.

A second variant provides that the two-phase cooling system has a liquid reservoir as a support element containing an additional quantity of working medium, wherein the liquid reservoir is connected to the cooling duct loop. The liquid reservoir can be provided in the heat sink block. The liquid reservoir is typically arranged adjacent to the cooling duct loop. The additional quantity of working medium preferably supports the startup of the two-phase cooling system.

A third variant provides that the cooling duct loop, as a support element, encloses an element for surface expansion, for example a spiral spring and/or cooling fins. The element for surface expansion preferably strengthens the thermally direct coupling in situ and thus supports the startup of the two-phase cooling system.

A fourth variant provides that the cooling duct loop adjacent to the heat source as a support element has a tapered cross-section. In other words the cooling duct loop is tapered adjacent to the heat source. The cooling duct loop can in principle alternatively or additionally be tapered adjacent to the heat sink. The tapering of the cooling duct loop advantageously strengthens the capillary effect and/or thus improves the startup of the two-phase cooling system. The tapering of the cooling duct loop in particular means a reduction in the cross-section in a segment of the cooling duct loop.

A fifth variant provides that the two-phase cooling system has an auxiliary heat source thermally directly coupled to the cooling duct loop as a support element. The auxiliary heat source is typically an electrical component, e.g. a heating resistor, and/or an inductive component. The auxiliary heat source can in particular be activated before the heat source is in operation and/or before the X-ray generation takes place. Following the startup of the two-phase cooling system the auxiliary heat source is typically deactivated. The auxiliary heat source is for example activated in that it is switched on, i.e. taken into operation. The auxiliary heat source and the heat source can for example be in operation alternately. The auxiliary heat source can in particular be active in a period between the provision of the high voltage and/or of the X-ray generation. The auxiliary heat source can in principle be in operation during the time the heat source is in operation. The auxiliary heat source typically generates a smaller power loss input, e.g. by a factor of 10, in particular by a factor of 1000, than the heat source. The auxiliary heat source typically generates only power loss. The auxiliary heat source is in particular designed, thanks to the power loss input generated, to support the startup of the two-phase cooling system, in particular the startup of the oscillating heat pipe. The auxiliary heat source in particular enables the oscillating heat pipe to start up or to have been started up if the at least one power-electronic circuitry part is out of operation. The auxiliary heat source is typically arranged adjacent to the heat source and/or to the heat sink. In principle it is conceivable for the auxiliary heat source to be arranged on a segment of the cooling duct loop on which the working medium has been displaced by gravity and/or centrifugal force, in order preferably to counter the displacement.

One form of embodiment provides that the cooling duct loop is designed to be angular, such that at least two part planes of the cooling duct loop stand at an angle of greater than 0° to one another. The angle is typically more than 0° and less than 360°. In accordance with this form of embodiment the cooling duct loop is not completely flat, i.e. configured in a single plane, but has an angle, e.g. a kink, or a rounding. In a side view or in a cross-section through the cooling duct loop the cooling duct loop can for example form an L, a U or an O. In the latter case the cooling duct loop is angular, such that the cooling duct loop can form a kind of circle. A part plane of the cooling duct loop in particular comprises the duct sections of the cooling duct loop which lie at least approximately in a geometric plane. If the cooling duct loop for example forms an L, one of the two part planes is in the first limb of the L and the other of the two part planes is in the second limb of the L. In principle a development of this form of embodiment is conceivable in which separate cooling duct loops are provided in each part plane, and are thermally directly coupled in pairs for example via the inlay. This form of embodiment is in particular advantageous because as a result the two-phase cooling system can be designed to be spatially more flexible.

Introduced into the heat sink block means in the present application in particular that an envelope of the heat sink block completely surrounds the introduced unit. The envelope can consist entirely of a material of the heat sink block and thus of the surface of the heat sink block or alternatively can also at least partially include a surface of the introduced unit. In other words the introduced unit can be entirely enclosed by the heat sink block, or the introduced unit, in particular the unit attached to the heat sink block, forms at least one part of a side of this arrangement consisting of heat sink block and introduced unit.

One form of embodiment provides that the heat source, in particular the at least one power-electronic circuitry part, as part of a duct wall of the heat sink block enclosing the working medium in the cooling duct loop, is introduced into the heat sink block and the working medium is electrically insulating. The advantage of this form of embodiment is in particular that the working medium is in direct contact with the heat source, as a result of which the thermally direct coupling is typically strengthened. The dissipation of heat from the heat source thus typically takes place directly on the surface of the at least one power-electronic circuitry part. In this case the working medium is electrically insulating, to ensure secure operation of the X-ray high-voltage generator. The heat source can be aligned to the cooling duct loop having the surface with most heat to be dissipated. The heat source can be the at least one power-electronic circuitry part of a circuit arrangement. The circuit arrangement can be designed to provide a high voltage.

One form of embodiment provides that the heat sink block is at least partially coated with a fluid-tight layer. The heat sink block is then advantageously protected against the ingress of a fluid and/or of a gas. The fluid-tight layer can for example contain $SiO2$ and/or a ceramic and/or a metal. The fluid-tight layer is typically a layer in contact with the heat sink block, in particular a coating of the heat sink block. A surface of the heat sink block coated with the fluid-tight layer is in particular a fluid-tight surface. A surface that does not have a fluid-tight layer or does not adjoin any other fluid-tight surface is generally permeable.

One form of embodiment provides that a retaining device and/or a fastening element for the mechanical stabilization of the heat sink block is introduced into the heat sink block. This form of embodiment is in particular advantageous because thanks to the additive manufacturing process the retaining device and/or the fastening element can be integrated into the heat sink block containing the polymer. The fastening element can in particular be a plug for the connection of a flat assembly and/or a spring element.

One form of embodiment provides that a printed circuit board is introduced into the heat sink block, and is designed for the electrical supply of the heat source. The printed circuit board can be populated with the at least one power-electronic circuitry part, in particular the circuit arrangement of the X-ray high-voltage generator. Alternatively or additionally further resistive and/or capacitive and/or inductive components can be provided on the printed circuit board. The fastening of the at least one power-electronic circuitry part and/or of the components takes place in particular in accordance with SMD assembly and/or THT assembly. SMD assembly is advantageous because it typically does not require a typically fluid-tight conductor path plane to be penetrated and thus it is not necessary to seal the perforation. The printed circuit board is in particular a board. The printed circuit board can be aligned with the component side toward the heat sink block. Alternatively the component side of the printed circuit board can point away from the heat sink block. For example, the printed circuit board can contain multiple conductor path planes, in particular made of copper and/or plastic and/or paper and/or ceramic. One of the conductor path planes, for example a layer facing away from the heat sink block, can be designed as continuous for electromagnetic shielding and/or for electrical insulation and/or preferably for sealing. A conductor path plane such as this in particular forms the fluid-tight layer and/or is a metal element.

One form of embodiment provides that the printed circuit board is multi-layered, wherein at least two of the conductor path planes of the printed circuit board are conductive and a diffusion duct is formed between the two conductive conductor path planes in a permeable conductor path plane arranged between the two conductive conductor path planes, wherein the opposing permeable ends of the diffusion duct are spaced apart from one another, such that because of its length the diffusion duct is fluid-tight. The diffusion duct is defined as the route in a medium which a fluid, for example a gas molecule, most probably covers because of the nature, in particular the porosity, of the medium. For example, the fluid in the diffusion duct can propagate along the permeable conductor path plane rather than through the adjoining conductive conductor path planes. Conductive conductor path planes typically contain metal, in particular copper. The permeable conductor path planes typically contain plastic and/or paper. The printed circuit board typically does not have continuous vias, but a blind via and/or a buried via. The disadvantage of a continuous via is in particular the necessity for sealing the printed circuit board at such a via. Non-continuous vias do not require a continuous drill hole and thus do not have this disadvantage. In this exemplary embodiment the conductive conductor path planes typically do not cover the whole surface of the heat sink block. Insulation sections are typically in each case arranged at the ends of the diffusion duct. An insulation section is provided for the electrical insulation of at least two sections of conductive conductor path planes. A conductive conductor path plane with one insulation section is interrupted. The insulation section in particular creates a connection perpendicular to the conductor path plane, so that because of the interruption the conductor path plane can work in a fluid-tight manner. The printed circuit board is therefore advantageously fluid-tight, because the spacing between the insulation sections has been selected to be sufficiently large. The opposing ends of the diffusion duct are advantageously far apart from one another and contain the permeable conductor path plane along the diffusion duct, such that because of the length of the diffusion duct the fluid cannot propagate through the diffusion duct.

One form of embodiment provides that the heat sink block is dimensioned such that a shortest diffusion route between the cooling duct loop and a permeable surface of the heat sink block is fluid-tight because of its length. The fluid-tightness is therefore advantageously achieved in that the diffusion route is sufficiently long. If the shortest diffusion route is fluid-tight, the whole heat sink block is thus fluid-tight.

One form of embodiment provides that the heat sink block is enveloped at least partially by a metal element, in particular by the printed circuit board and/or a foil and/or a metal sheet. The metal element is in particular fluid-tight, capable of shielding and/or conductive and can be provided for electromagnetic shielding and/or for electrical insulation and/or as a fluid-tight layer for sealing the heat sink block against an egress of the working medium. The metal element can in particular be designed as a sealing cover for sealing. The metal element can in particular be the printed circuit board. The metal element can be multi-layered.

One form of embodiment provides that the two-phase cooling system has an intermediate heat accumulator, in particular made of copper and/or aluminum, wherein the intermediate heat accumulator is thermally directly coupled to the at least one power-electronic circuitry part via a heat-distributing element and wherein the heat-distributing element adjoins the cooling duct loop in a planar manner. The intermediate heat accumulator is for example a metal block, in particular made of copper and/or aluminum. The intermediate heat accumulator preferably enables a buffering of a maximum power loss input by the heat source. The heat-distributing element in particular consists of diamond and/or a graphite material. Because it adjoins in a planar manner the heat-distributing element typically enlarges the heat transfer area between the working medium and the at least one power-electronic circuitry part and thus improves the thermal direct coupling. The heat-distributing element can in particular form the duct wall in a segment of the cooling duct loop. The heat-distributing element can have a length which correlates with the spacing between the intermediate heat accumulator and the heat source.

An inventive X-ray high-voltage generator for the provision of a high voltage contains the two-phase cooling system and a circuit arrangement with at least one power-electronic circuitry part, wherein the at least one power-electronic circuitry part forms the heat source in operation, wherein the at least one power-electronic circuitry part is directly thermally coupled to the two-phase cooling system for dissipating heat from the heat source at the heat sink. The circuit arrangement can be at least partially arranged on the printed circuit board or can be integrated into the printed circuit board.

Since the X-ray high-voltage generator contains the two-phase cooling system, the X-ray high-voltage generator shares the advantages discussed above in connection with the two-phase cooling system and the forms of embodiment thereof.

The X-ray high-voltage generator is designed for the provision of the high voltage in particular at an output of the X-ray high-voltage generator. The provision of the high voltage in particular comprises the generation of the high voltage. During the provision the X-ray high-voltage generator in particular transforms an input-side standard line voltage, which typically lies not in but below the kV range, or an intermediate circuit voltage into the high voltage. The high voltage is typically present at the output of the X-ray high-voltage generator. The high voltage is typically greater than 10 kV and/or less than 200 kV, and is for example between 20 and 150 kV, in particular between 70 and 120 kV. The X-ray high-voltage generator, for example the output, can typically be connected to the X-ray tube, in particular an input of the X-ray tube, via a high voltage cable for the transmission of the high voltage. The X-ray tube can in particular generate the X-rays as a function of the high voltage provided by the X-ray high-voltage generator. The generated X-rays typically have an energy spectrum up to the absolute value of the high voltage multiplied by the elementary charge e. The X-rays are typically not generated in the X-ray high-voltage generator, but in the X-ray tube.

The provision of the high voltage takes place in particular via the circuit arrangement. The circuit arrangement comprises at least one power-electronic circuitry part for the provision, in particular the generation, of the high voltage. Normally the circuit arrangement additionally comprises further electronic components and/or power-electronic circuitry parts. The at least one power-electronic circuitry part can for example be a power transistor, a power-electronic component, an inductive component, a resistive component and/or a capacitive component. The at least one power-electronic circuitry part can in particular be built into a TO-247 housing, an SMD housing, a THT housing or a power module.

The high voltage is typically provided during operation of the X-ray high-voltage generator. During this the at least one power-electronic circuitry part of the circuit arrangement is normally in operation, in particular under load. The operation of the at least one power-electronic circuitry part requires the use of electrical power, wherein normally only part of the electrical power is provided in the form of the high voltage and a further part drops out as a power loss. The at least one power-electronic circuitry part is a heat source, at least in operation. The power loss input is typically so high that the heat source is cooled in operation by the two-phase cooling system. The power loss input can vary in operation. In particular, following the provision of the high voltage, the at least one power-electronic circuitry part can continue to exist for a certain period as a heat source to be cooled.

An inventive X-ray tube assembly contains

- the X-ray high-voltage generator for the provision of a high voltage and
- an X-ray tube for X-ray generation using the high voltage provided.

Since the X-ray tube assembly contains the two-phase cooling system, the X-ray tube assembly shares the advantages discussed above in connection with the two-phase cooling system and the forms of embodiment thereof. The X-ray tube assembly in particular forms an X-ray generation device.

The X-ray tube typically contains an evacuated X-ray tube housing which encloses a high vacuum, an electron emitter and an anode. The anode can be a rotating anode or a stationary anode. In the embodiment as a rotating anode, a distinction is typically made between a rotating anode X-ray tube, in which the anode rotates inside the X-ray tube housing, and a rotating piston X-ray tube, in which the anode rotates together with the X-ray tube housing.

The electron emitter is in particular a field effect emitter or a thermionic emitter. The field effect emitter typically contains carbon nanotubes or silicon nanotubes or molybdenum nanotubes. The electron emission in the case of the field effect emitter is typically effected by the application of a gate voltage which extracts the electrons from these nanotubes using the electrical field occurring in the tips of the nanotubes, as a result of which the electron stream is formed. Additionally or alternatively to switching via the gate voltage, a generated electron stream can be blocked by a barrier grid. A current limiting unit can be placed upstream of the nanotubes. The thermionic emitter is for example a helical emitter or a flat emitter, which can be heated directly or indirectly.

The electron emitter is designed as a cathode or is arranged together with a cathode opposite the anode. The high voltage provided is present between the cathode and the anode. The X-ray high-voltage generator is connected to the X-ray tube for the transmission of the high voltage provided. The electrons emitted by the electron emitter are accelerated via the high voltage in the direction of the anode and the X-rays are generated during the interaction at a focal spot on the anode.

The X-rays generated can in particular be used for medical imaging and/or material testing. Typical applications in medical imaging are angiography, computed tomography, fluoroscopy, imaging for radiotherapy, mammography and/or radiography. The X-ray tube assembly is generally used in combination with an X-ray detector. Additionally, depending on the type of application, incorporation into an imaging system, having for example a C-arm or a computed tomography system, can take place.

The inventive computed tomography device contains

- a circular gantry with a rotating part and a stationary part, as well as
- the X-ray high-voltage generator or
- the X-ray tube assembly with the X-ray high-voltage generator,
- wherein the two-phase cooling system is arranged on the gantry.

Since the computed tomography device contains the two-phase cooling system, the computed tomography device shares the advantages discussed above in connection with the two-phase cooling system and the forms of embodiment thereof.

The rotating part of the gantry is typically spaced apart from the stationary part in an air gap. The power for operation of the high-voltage generator and thus of the X-ray tube assembly is transmitted across this air gap from the stationary part to the rotating part for example in a contact-based or contactless manner. In the reverse direction, data from the X-ray detector is for example transmitted preferably contactlessly, for example electrostatically, capacitively or optically.

DETAILED DESCRIPTION

Figure 1:
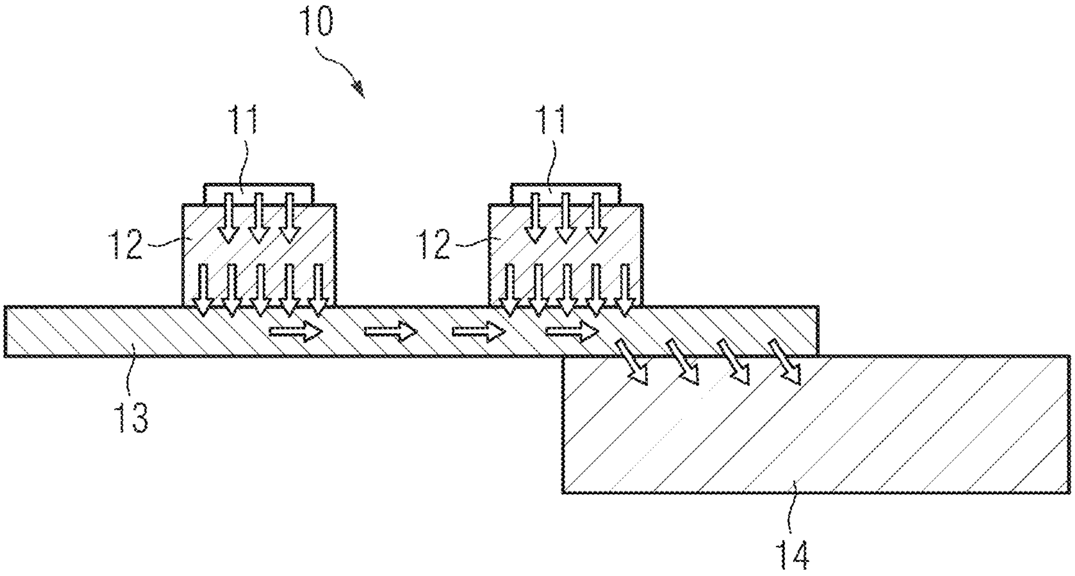
FIG 1 (Prior Art)
FIG. 1 shows a conventional X-ray high-voltage generator in accordance with the prior art.

FIG. 1 shows a conventional X-ray high-voltage generator 10 in accordance with the prior art.

The X-ray high-voltage generator 10 has, as part of a circuit arrangement for the provision of a high voltage, two power-electronic circuitry parts 11 as heat sources. Both the power-electronic circuitry parts 11 are in each case arranged on a heat sink pad 12, which for example consists of copper. A support plate 13 carries both the heat sink pads 12 and connects them to a heat sink 14. The support plate 13 can be designed to be electrically insulating. Alternatively or additionally an insulation layer for the electrical insulation of the power-electronic circuitry parts 11 can be provided as part of the conventional X-ray high-voltage generator 10. The arrows indicate the heat flow from the heat sources to the heat sink 14.

Figure 2:
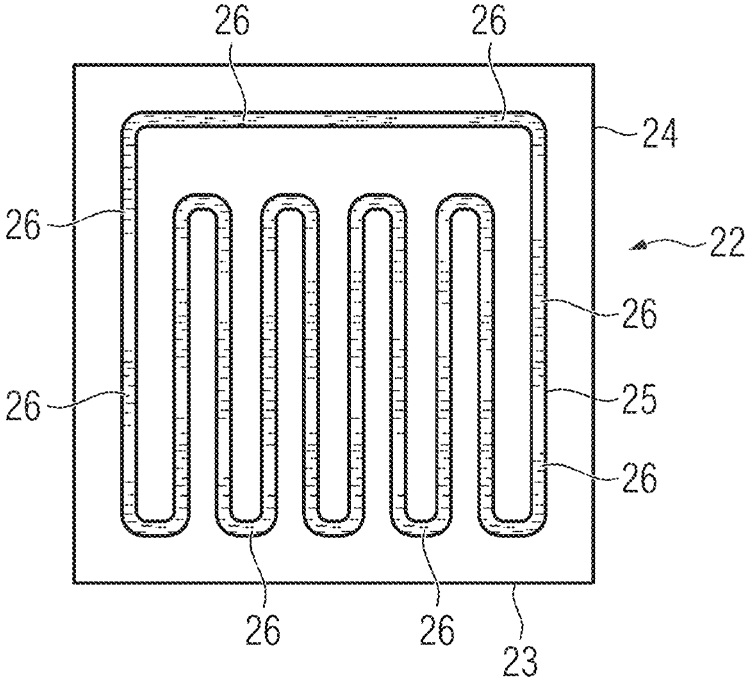
FIG. 2 shows an inventive two-phase cooling system.

FIG. 2 shows a section of an inventive two-phase cooling system 22 for an X-ray high-voltage generator.

The two-phase cooling system 22 contains a heat sink 23 or itself acts as a heat sink 23 on the sides facing away from a heat source. For dissipation of heat from the heat source the two-phase cooling system 22 contains a heat sink block 24. The heat sink block 24 spatially surrounds a cooling duct loop 25. The cooling duct loop 25 is part of the two-phase cooling system 22. The cooling duct loop 25 is at least partially filled with a working medium 26 and acts as an oscillating heat pipe. The heat sink block 24 consists of a material which contains a polymer. The polymer can be polypropylene, polycarbonate, polyetheretherketone, polyamide or acrylnitrile-butadiene-styrole copolymer.

Purely for illustrative purposes the cooling duct loop 25 has duct sections arranged in a meander shape. For example, 10 parallel duct sections are shown. The number of parallel duct sections can be over 50, in particular over 500, for example between 2 and 1000. A spacing, i.e. a web width, between the duct sections is typically between 0.01 and 5 mm, for example between 0.1 and 1 mm. If the heat sink block 24 consists of polymer, the web width is for example at least 0.3 mm, preferably 0.5 mm.

In this exemplary embodiment the material exclusively contains the polymer. Alternatively, the material can additionally contain a metal and/or a ceramic, wherein the material is homogenized by commingling.

FIG. 2 shows a cross-section along a plane of the cooling duct loop 25. The section plane A-A is indicated in FIG. 4. In the following FIGS. 3 to 11 this plane of the cooling duct loop 25 stands substantially perpendicular on the plane of the drawing sheet in comparison with FIG. 2.

Figure 3:
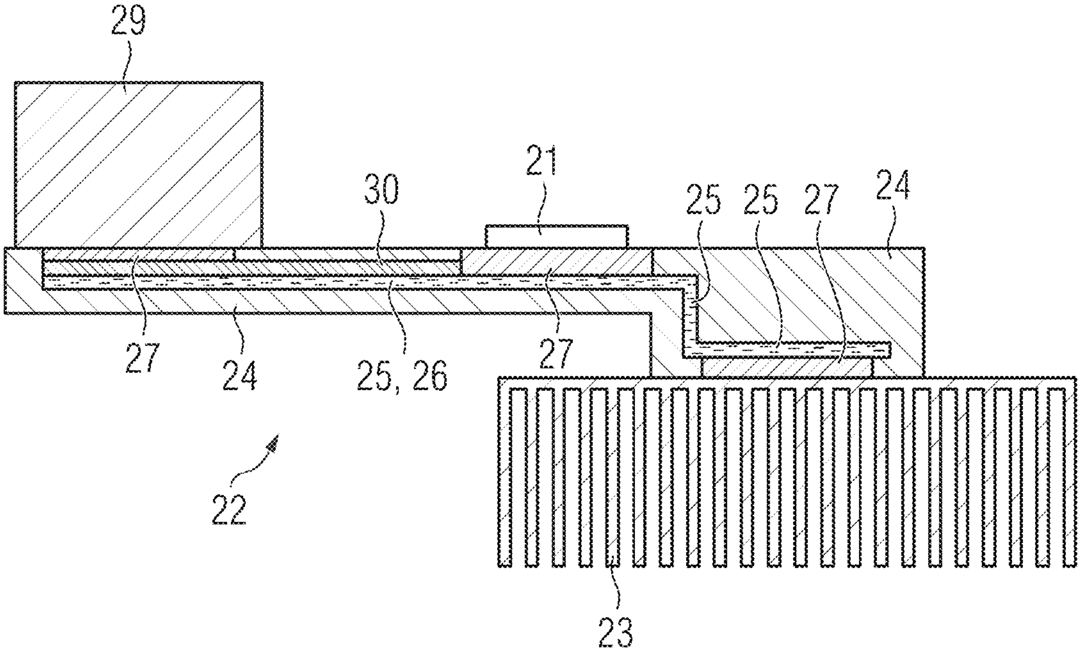
FIG. 3 shows a first exemplary embodiment of the two-phase cooling system.
Figure 4:
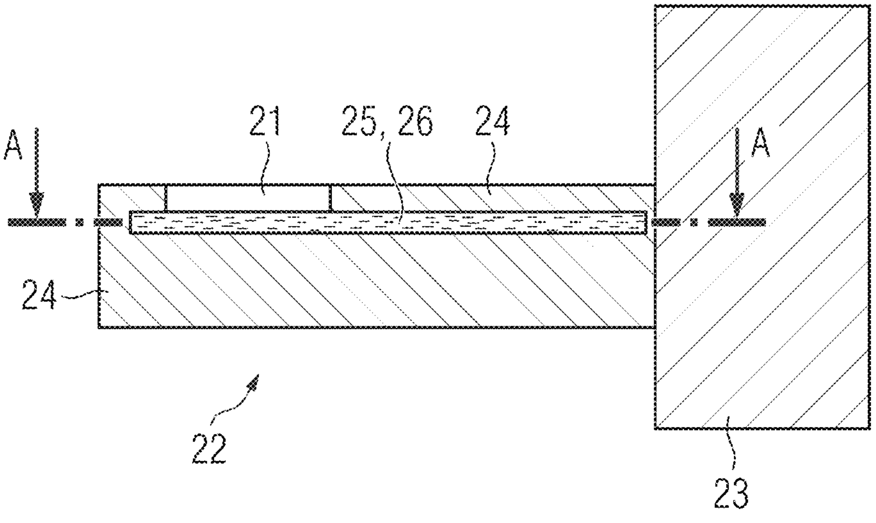
FIG. 4 shows a second exemplary embodiment of the two-phase cooling system.

FIG. 3 shows a first exemplary embodiment of the two-phase cooling system 22.

The two-phase cooling system 22 contains an intermediate heat accumulator 29, in particular made of copper and/or aluminum. The intermediate heat accumulator 29 can be thermally directly coupled to at least one power-electronic circuitry part 21 e.g. of an X-ray high-voltage generator via a heat-distributing element 30, in particular made of diamond and/or a graphite material and in this exemplary embodiment is directly thermally coupled as a heat source. The heat-distributing element 30 adjoins the cooling duct loop 25 in a planar manner.

In this exemplary embodiment the heat sink block 24 contains an inlay 27, in particular made of copper and/or aluminum, wherein the material of the inlay 27 has a higher thermal conductivity than the material of the heat sink block 24. An inlay element can in principle be provided between the heat-distributing element 30 and the intermediate heat accumulator 29 and/or the at least one power-electronic circuitry part 21 and/or the heat sink 23. The three inlay elements of the inlay 27 in FIG. 3 in each case thermally directly couple the intermediate heat accumulator 29, at least one power-electronic circuitry part 21 as a heat source and the heat sink 23 to the cooling duct loop 25. The heat sink 23 in this exemplary embodiment is provided with a shape that increases the surface, in particular cooling ribs.

The intermediate heat accumulator 29 in this figure is arranged such that the at least one power-electronic circuitry part 21 is arranged between the intermediate heat accumulator 29 and the heat sink 23. Alternatively it is conceivable for the intermediate heat accumulator 29 to be arranged between the at least one power-electronic circuitry part 21 and the heat sink 23. Between in this connection means on the shortest route along the cooling duct loop 25.

FIG. 4 shows a second exemplary embodiment of the two-phase cooling system 22.

The heat source, here the at least one power-electronic circuitry part 21, is introduced into the heat sink block 24 as part of a duct wall of the heat sink block 24 enclosing the working medium 26 in the cooling duct loop 25. The working medium 26 is dielectrically or electrically insulating.

Figure 5:
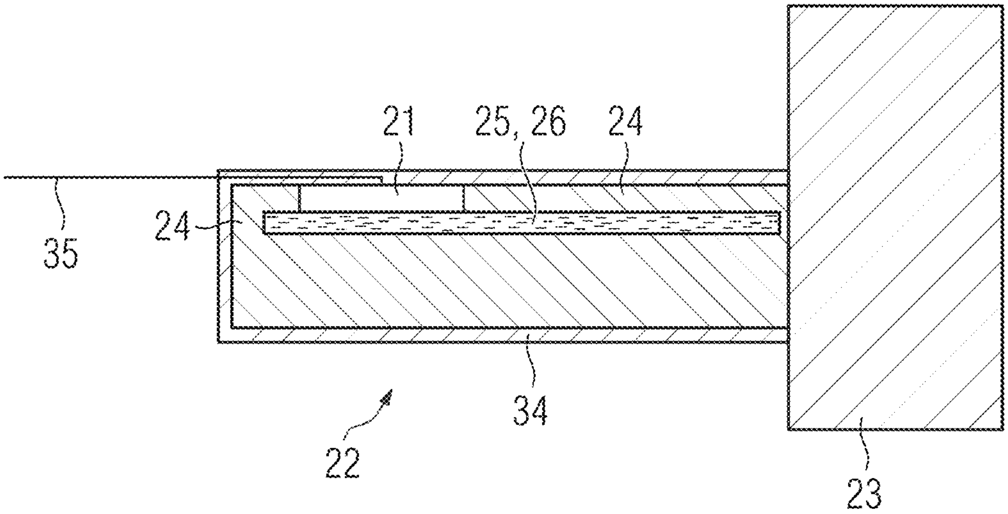
FIG. 5 shows a third exemplary embodiment of the two-phase cooling system.

FIG. 5 shows a third exemplary embodiment of the two-phase cooling system 22.

The heat sink block 24 is at least partially coated with a metal element 34 as a fluid-tight layer. In this exemplary embodiment the heat sink block 24 is thus completely enveloped.

The heat source, for example the at least one power-electronic circuitry part 21, is introduced into the heat sink block 24 as part of a duct wall of the heat sink block 24 enclosing the working medium 26 in the cooling duct loop 25. The working medium 26 is in this case dielectrically or electrically insulating.

A printed circuit board, comprising a power supply 35 which is designed for the electrical supply of the X-ray high-voltage generator 20, e.g. of the at least one power-electronic circuitry part 21, is introduced into the heat sink block 24. In principle it is conceivable for the power supply 35 to be designed as a busbar. The printed circuit board forms the metal element 34.

Figure 6:
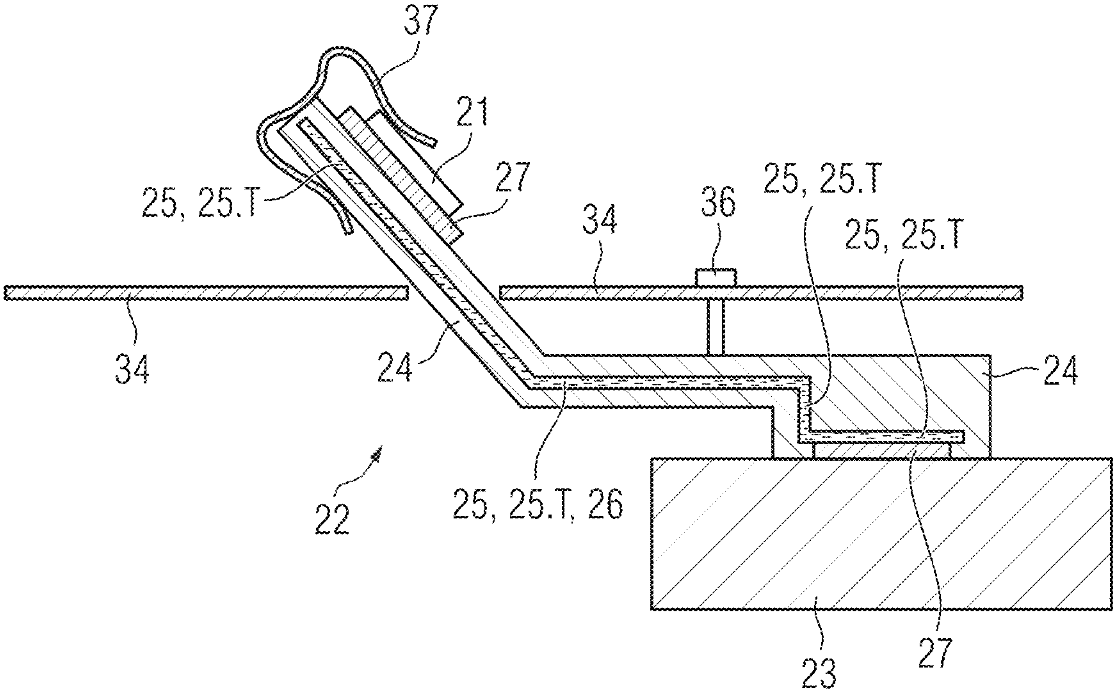
FIG. 6 shows a fourth exemplary embodiment of the two-phase cooling system.

FIG. 6 shows a fourth exemplary embodiment of the two-phase cooling system 22.

In this exemplary embodiment the heat sink block 24 contains the inlay 27. The material of the inlay 27 has a higher thermal conductivity than the material of the heat sink block 24. The cooling duct loop 25 is designed as angular, such that at least two, in this exemplary embodiment four, part planes 25.T of the cooling duct loop 25 stand at an angle of greater than 0° to one another.

Figure 10:
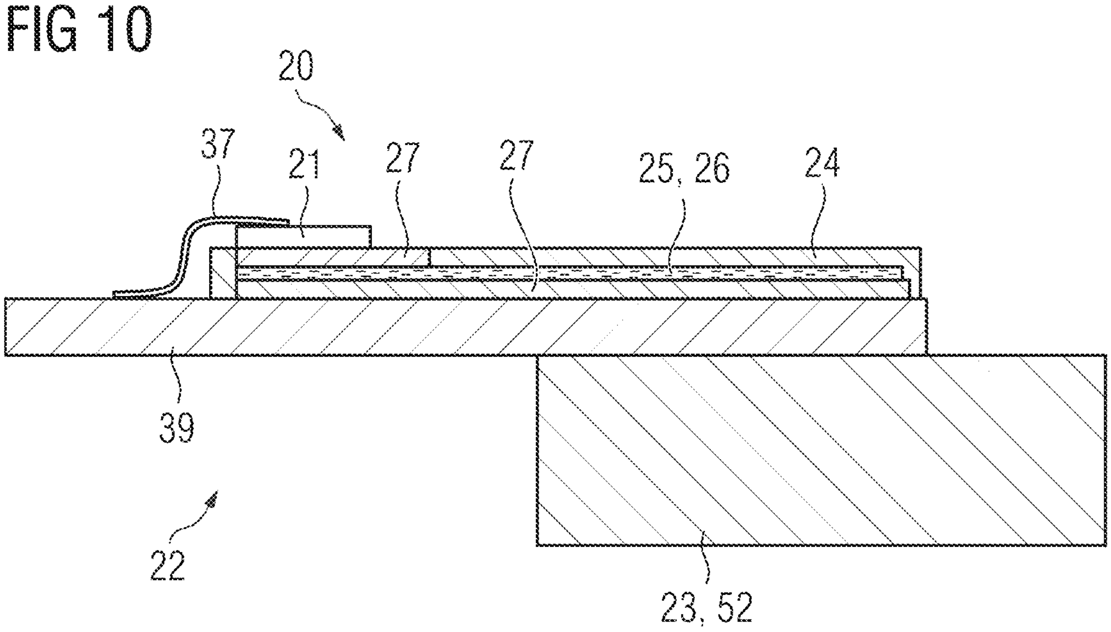
FIG. 10 shows a first exemplary embodiment of the X-ray high-voltage generator.

FIG. 10 additionally shows that a fastening element 37, such as e.g. a type of spring element, for fastening the at least one power-electronic circuitry part 21 is introduced into the heat sink block 24 for the mechanical stabilization of the heat sink block 24 at the high-voltage generator 20. The metal element 34, in this case a printed circuit board, is fastened to the heat sink block 24 with a retaining device 36. The retaining device 36 is for example a screw and/or a bracket.

The heat sink block 24 offers the advantage that thanks to the angular alignment geometrically complex structures of the two-phase cooling system 22 can be realized, e.g. through a recess in the metal element 34.

Figure 7:
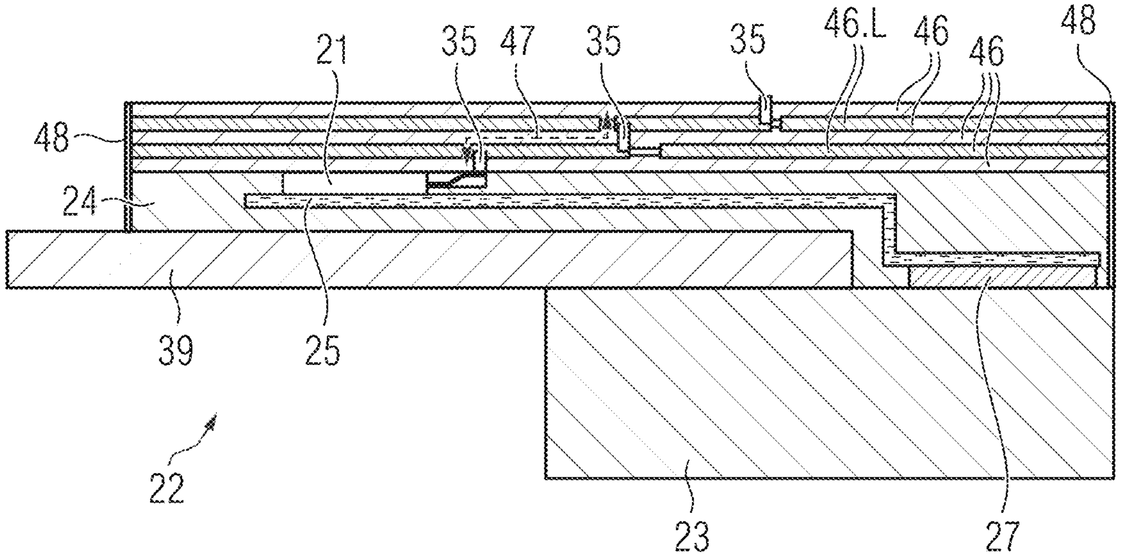
FIG. 7 shows a fifth exemplary embodiment of the two-phase cooling system.

FIG. 7 shows a fifth exemplary embodiment of the two-phase cooling system 22.

A printed circuit board is introduced into the heat sink block 24, and is designed for the electrical supply of the heat source. The heat source in this exemplary embodiment forms a power-electronic circuitry part 21. The heat source is supplied with electrical power via non-continuous vias 35 as a power supply in the printed circuit board.

The printed circuit board is multi-layered and thus has multiple, in this exemplary embodiment five, conductor path planes 46. The printed circuit board, in particular the multiple conductor path planes 46, is/are sealed laterally fluid-tight with a fluid-tight layer 48.

At least two of the conductor path planes 46 of the printed circuit board are conductive 46.L. A diffusion duct 47 in a permeable conductor path plane 46 arranged between the two conductive conductor path planes 46.L is formed between the two conductive conductor path planes 46.L. The diffusion duct 47 is indicated by a dashed double arrow. The opposing permeable ends of the diffusion duct 47 are spaced apart from one another such that because of its length the diffusion duct 47 is fluid-tight.

The heat source is introduced into the heat sink block 24 as part of a duct wall of the heat sink block 24 enclosing the working medium 26 in the cooling duct loop 25. The working medium 26 is electrically insulating. The two-phase cooling system 22 is fastened to a support plate 39. The latter couples the two-phase cooling system 22 and the heat sink 23. At least one inlay 27 improves the transfer of heat from the cooling duct loop 25 to the heat sink 23.

Figure 8:
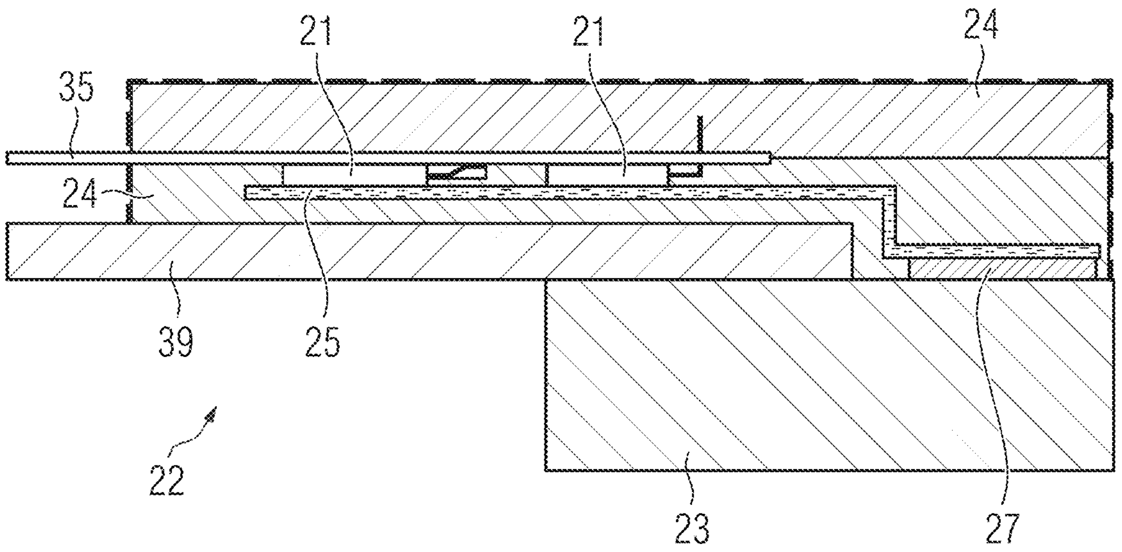
FIG. 8 shows a sixth exemplary embodiment of the two-phase cooling system.

FIG. 8 shows a sixth exemplary embodiment of the two-phase cooling system 22.

The two-phase cooling system 22 is designed to dissipate heat from two heat sources. Two power-electronic circuitry parts 21 form the heat sources, wherein one is connected to a power supply 35 in accordance with SMD assembly and the other in accordance with THT assembly.

The power supply 35 in this exemplary embodiment is a busbar. Alternatively it is conceivable for a conductive conductor path plane of a printed circuit board to be used as a power supply.

The heat sink block 24 is dimensioned such that because of its length the shortest diffusion route between the cooling duct loop 25 and a permeable surface of the heat sink block 24 is fluid-tight. The permeable surface of the heat sink block 24 is represented by a dashed line.

The heat sink block 24 in this exemplary embodiment is designed as multi-part. An upper part is arranged above the heat sources as a type of cover and a lower part is arranged underneath the heat sources.

Figure 9:
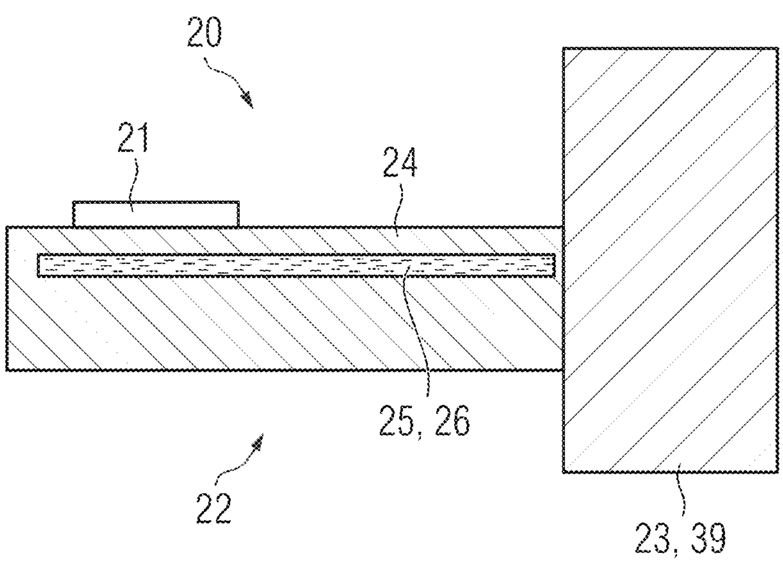
FIG. 9 shows an inventive X-ray high-voltage generator.

FIG. 9 shows an X-ray high-voltage generator 20.

The X-ray high-voltage generator 20 is designed for the provision of a high voltage and contains the two-phase cooling system 22 and a circuit arrangement with at least one power-electronic circuitry part 21. The at least one power-electronic circuitry part 21 forms the heat source in operation. The at least one power-electronic circuitry part 21 is directly thermally coupled to the two-phase cooling system 22 to dissipate heat from the heat source at the heat sink 23.

A support plate 39 is connected and thermally directly coupled to the heat sink block 24 in order to further improve the cooling power. As a result, in particular the support plate 39 forms the heat sink 23 of the two-phase cooling system 22. The support plate 39 can for example be a housing of the X-ray high-voltage generator 20 or a gantry of a computed tomography device 50 (not shown) or a frame of an X-ray tube assembly 40 (not shown).

FIG. 10 shows a first exemplary embodiment of the X-ray high-voltage generator 20.

For a better heat splay an inlay element of the inlay 27 adjoins a support plate 39 in a planar manner in order to improve the thermal input into the support plate 39. The heat sink 23 is directly thermally coupled to the support plate 39. The latter can for example be the gantry of a computed tomography device 40 (not shown), in particular the rotating part 52.

In comparison to FIG. 9 the support plate 39 in FIG. 10 is not arranged laterally to the heat sink block 24, but below it.

Figure 11:
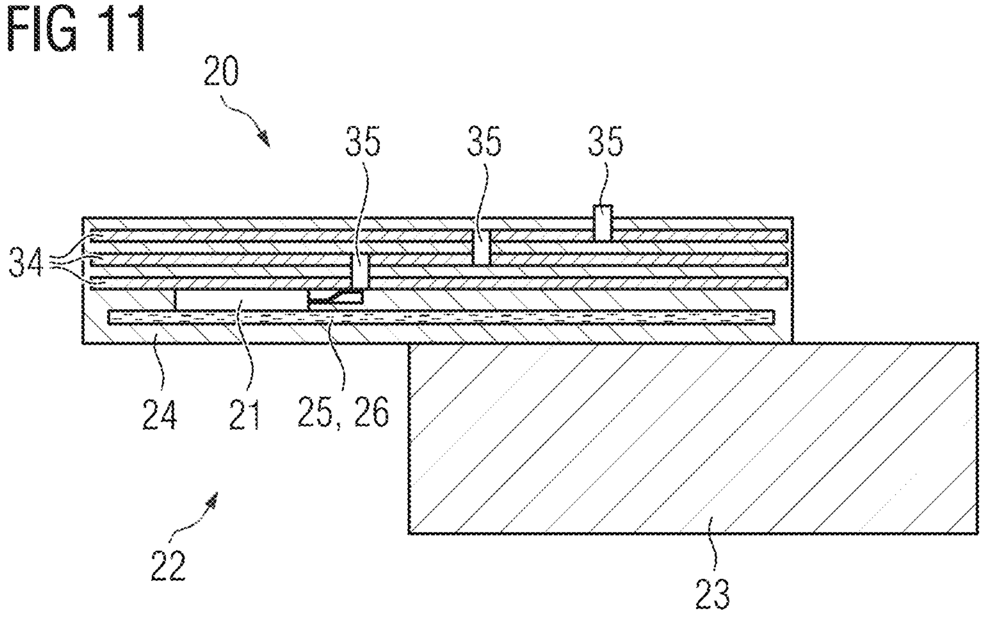
FIG. 11 shows a second exemplary embodiment of the X-ray high-voltage generator.

FIG. 11 shows a second exemplary embodiment of the X-ray high-voltage generator 20.

The heat source, in other words the at least one power-electronic circuitry part 21, is introduced into the heat sink block 24 as part of a duct wall of the heat sink block 24 enclosing the working medium 26 in the cooling duct loop 25. As a result, the at least one power-electronic circuitry part 21 is cooled directly by the working medium 26. The working medium 26 is in this case dielectrically or electrically insulating.

The heat sink block 24 is sealed on the side with the at least one power-electronic circuitry part 21 via the metal element 34 as a fluid-tight layer. The metal element 34 is a printed circuit board with multiple conductor path planes. The printed circuit board is a multi-layered board, wherein its conductor path planes are provided with so-called "buried vias" as a power supply 35.

Figure 12:
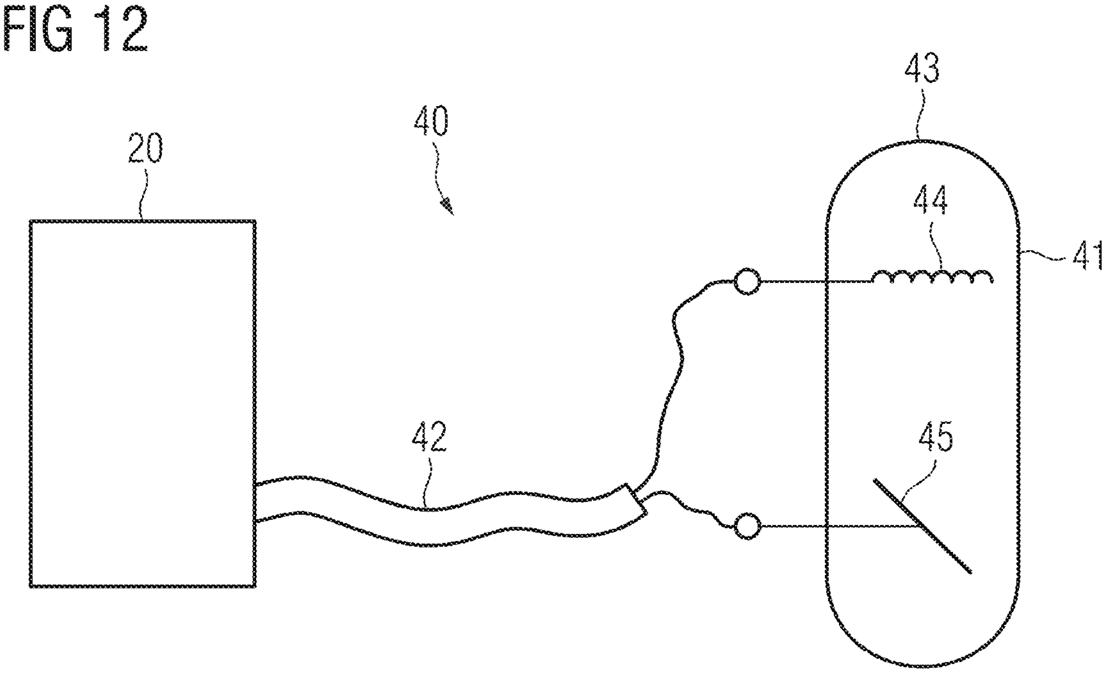
FIG. 12 shows an inventive X-ray tube assembly and FIG. 13 shows an inventive computed tomography device.

FIG. 12 shows an inventive X-ray tube assembly 40.

The X-ray tube assembly 40 contains an X-ray high-voltage generator 20 for the provision of a high voltage and an X-ray tube 41. The X-ray high-voltage generator 20 and the X-ray tube 41 are connected to a high-voltage cable 42 for the transmission of the high voltage.

The X-ray tube 42 contains an X-ray tube housing 43, an electron emitter 44 arranged therein as a cathode, and an anode 45. The high voltage is present between the electron emitter 44 and the anode 45.

Figure 13:
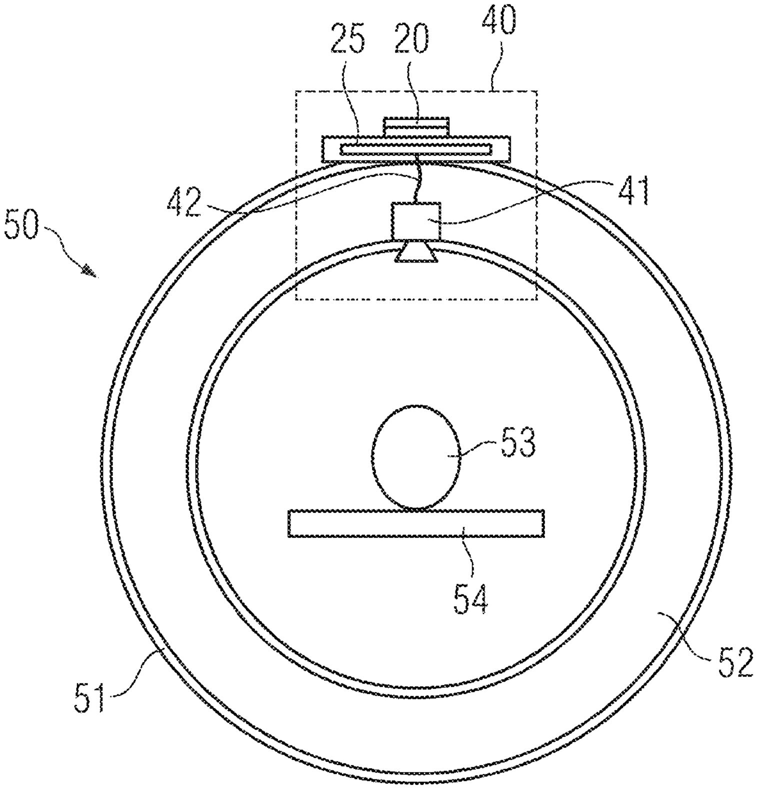

FIG. 13 shows a computed tomography device 50.

The computed tomography device 50 contains a circular gantry with a rotating part 52 and a stationary part 51 as well as the X-ray high-voltage generator 20 as part of the X-ray tube assembly 40. The two-phase cooling system 22 is arranged on the gantry. In this exemplary embodiment the rotating part 52 and the stationary part 51 are arranged in a disk-shaped manner. Alternatively a drum-shaped embodiment can be considered.

The X-ray tube assembly 40 is arranged on the rotating part 52. A patient 53 is mounted on a patient couch 54.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being “directly” connected, engaged, interfaced, or coupled to another element, there are no intervening elements present. Other words used to describe the relationship between elements should be interpreted in a like fashion (e.g., “between,” versus “directly between,” “adjacent,” versus “directly adjacent,” etc.).

The terminology used herein is for the purpose of describing particular embodiments only and is not intended to be limiting of the embodiments. As used herein, the singular forms “a,” “an,” and “the,” are intended to include the plural forms as well, unless the context clearly indicates otherwise. As used herein, the terms “and/or” and “at least one of” include any and all combinations of one or more of the associated listed items. It will be further understood that the terms “comprises,” “comprising,” “includes,” and/or “including,” when used herein, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Expressions such as “at least one of,” when preceding a list of elements, modify the entire list of elements and do not modify the individual elements of the list. Also, the term “example” is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing embodiments. The present invention may, however, be embodied in many alternate forms and should not be construed as limited to only the embodiments set forth herein.

Although the present invention has been illustrated and described in greater detail by the preferred exemplary embodiments, the present invention is nevertheless not restricted by the disclosed examples and other variations can be derived therefrom by the person skilled in the art, without departing from the scope of protection of the present invention.

What is claimed is:

1. A two-phase cooling system for an X-ray high-voltage generator of an X-ray generation device, the two-phase cooling system comprising:

- a heat sink block spatially surrounding a cooling duct loop, the cooling duct loop being at least partially filled with a working medium, and the cooling duct loop being configured to act as an oscillating heat pipe, the heat sink block including
  - a material containing a polymer, and
  - a multi-layered printed circuit board configured for electrical supply of a heat source of the X-ray generation device, at least two conductor path planes of the printed circuit board being conductive and a diffusion duct in a permeable conductor path plane between the at least two conductive conductor path planes being between the at least two conductive conductor path planes, wherein opposing permeable ends of the diffusion duct are spaced apart from one another such that the diffusion duct is fluid-tight as a result of a length of the diffusion duct; and
- a heat sink coupled to the heat sink block, the heat sink configured to dissipate heat from the heat source.

2. The two-phase cooling system as claimed in claim 1, wherein the material exclusively contains the polymer.

3. The two-phase cooling system as claimed in claim 1, wherein the material contains the polymer and at least one of a metal or a ceramic, and wherein the material is homogenized by commingling.

4. The two-phase cooling system as claimed in claim 1, wherein at least one of a retaining device or a fastening element for mechanical stabilization of the heat sink block on the X-ray high-voltage generator is introduced into the heat sink block.

5. The two-phase cooling system as claimed in claim 1, wherein the heat sink block is dimensioned such that because of a length of the heat sink block, a shortest diffusion route between the cooling duct loop and a permeable surface of the heat sink block is fluid-tight.

6. The two-phase cooling system as claimed in claim 1, wherein the heat sink block includes the heat source as part of a duct wall of the heat sink block, the duct wall enclosing the working medium in the cooling duct loop, and wherein the working medium is electrically insulating.

7. The two-phase cooling system as claimed in claim 1, wherein the heat sink block is at least partially coated with a fluid-tight layer.

8. The two-phase cooling system as claimed in claim 1, further comprising:

- an intermediate heat accumulator thermally directly coupled to the heat source via a heat-distributing element, wherein
  - the heat-distributing element adjoins the cooling duct loop in a planar manner.

9. The two-phase cooling system as claimed in claim 1, wherein the heat sink block contains an inlay, wherein a material of the inlay has a higher thermal conductivity than the material of the heat sink block.

10. The two-phase cooling system as claimed in claim 1, wherein the cooling duct loop is configured to be angular, such that at least two partial planes of the cooling duct loop stand at an angle of greater than 0° to one another.

11. An X-ray high-voltage generator for provision of a high voltage, the X-ray high-voltage generator comprising:

the two-phase cooling system as claimed in claim 1; and a circuit arrangement with at least one power-electronic circuitry part, the at least one power-electronic circuitry part configured to form the heat source in operation, wherein the at least one power-electronic circuitry part is directly thermally coupled to the two-phase cooling system to dissipate heat from the heat source at the heat sink.

12. An X-ray tube assembly, comprising:

the X-ray high-voltage generator as claimed in claim 11; and an X-ray tube configured to generate X-rays using the high voltage.

13. A computed tomography device, comprising:

the X-ray high-voltage generator as claimed in claim 11; and a gantry having a rotating part and a stationary part, wherein the two-phase cooling system is arranged on the gantry.

14. A computed tomography device, comprising:

the X-ray tube assembly as claimed in claim 12; and a gantry having a rotating part and a stationary part, wherein the two-phase cooling system is arranged on the gantry.

15. The two-phase cooling system as claimed in claim 1, further comprising:

an intermediate heat accumulator thermally directly coupled to the heat source via a heat-distributing element, wherein the heat-distributing element adjoins the cooling duct loop in a planar manner, and the intermediate heat accumulator is composed of at least one of copper or aluminum and the heat-distributing element is composed of at least one of diamond or a graphite material.

16. The two-phase cooling system as claimed in claim 1, wherein the heat sink block contains an inlay, a material of the inlay has a higher thermal conductivity than the material of the heat sink block, and the inlay is composed of at least one of copper or aluminum.

* * * * *